(12) United States Patent
Balluchi et al.

(10) Patent No.: US 11,074,192 B2
(45) Date of Patent: *Jul. 27, 2021

(54) LOGICAL TO PHYSICAL TABLE FRAGMENTS

(71) Applicant: Micron Technology, Inc., Boise, ID (US)

(72) Inventors: Daniele Balluchi, Cernusco sul Naviglio (IT); Dionisio Minopoli, Arzano (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/655,769

(22) Filed: Oct. 17, 2019

(65) Prior Publication Data

US 2020/0050554 A1 Feb. 13, 2020

Related U.S. Application Data

(63) Continuation of application No. 16/052,921, filed on Aug. 2, 2018, now Pat. No. 10,592,427.

(51) Int. Cl.
*G06F 12/1009* (2016.01)
(52) U.S. Cl.
CPC .................. *G06F 12/1009* (2013.01)
(58) Field of Classification Search
CPC . G06F 12/0292; G06F 12/023; G06F 12/0246
See application file for complete search history.

(56) References Cited

U.S. PATENT DOCUMENTS

| 10,592,427 | B2* | 3/2020 | Balluchi | G06F 12/0238 |
| 2010/0095049 | A1 | 4/2010 | Manning | |
| 2010/0332730 | A1* | 12/2010 | Royer, Jr. | G06F 12/0246 711/103 |
| 2012/0023282 | A1* | 1/2012 | Rub | G06F 12/0246 711/103 |
| 2013/0326121 | A1* | 12/2013 | Cheng | G06F 3/0679 711/103 |

(Continued)

OTHER PUBLICATIONS

International Search Report and Written Opinion from related International Application Serial No. PCT/US2019/041101 dated Oct. 23, 2019, 9 pages.

(Continued)

*Primary Examiner* — Edward J Dudek, Jr.
(74) *Attorney, Agent, or Firm* — Brooks, Cameron & Huebsch, PLLC

(57) ABSTRACT

Logical to physical tables each including logical to physical address translations for first logical addresses can be stored. Logical to physical table fragments each including logical to physical address translations for second logical address can be stored. A first level index can be stored. The first level index can include a physical table address of a respective one of the logical to physical tables for each of the first logical addresses and a respective pointer to a second level index for each of the second logical addresses. The second level index can be stored and can include a physical fragment address of a respective logical to physical table fragment for each of the second logical addresses.

12 Claims, 10 Drawing Sheets

(56) References Cited

U.S. PATENT DOCUMENTS

| | | |
|---|---|---|
| 2013/0346675 A1* | 12/2013 | Yeh .................... G06F 12/0246 |
| | | 711/103 |
| 2015/0019794 A1 | 1/2015 | Byun |
| 2015/0106556 A1 | 4/2015 | Yu et al. |
| 2015/0220552 A1 | 8/2015 | Duzly et al. |
| 2015/0309926 A1 | 10/2015 | Damle et al. |
| 2016/0246530 A1* | 8/2016 | Mylavarapu .......... G06F 3/0616 |
| 2017/0269844 A1 | 9/2017 | Paley et al. |
| 2017/0351614 A1 | 12/2017 | Camp et al. |

OTHER PUBLICATIONS

Rouse, Margaret, "What is 3D XPoint", Aug. 2017, 6 pages

* cited by examiner

LOGICAL TO PHYSICAL TABLE FRAGMENTS

PRIORITY INFORMATION

This application is a continuation of U.S. application Ser. No. 16/052,921, filed on Aug. 2, 2018, the contents of which are incorporated herein by reference.

TECHNICAL FIELD

The present disclosure relates generally to semiconductor memory and methods, and more particularly, to a logical to physical table fragments.

BACKGROUND

Memory devices are typically provided as internal, semiconductor, integrated circuits in computers or other electronic devices. There are many different types of memory including volatile and non-volatile memory. Volatile memory can require power to maintain its data (e.g., host data, error data, etc.) and includes random-access memory (RAM), dynamic random access memory (DRAM), and static random access memory (SRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

"Main memory" is a term of art that describes memory storing data that can be directly accessed and manipulated by a processor. An example of main memory is DRAM. Main memory provides primary storage of data and can be volatile memory or non-volatile memory (e.g., in the case of non-volatile RAM managed as a main memory, such as a non-volatile dual in-line memory module (DIMM)). Secondary storage can be used to provide secondary storage of data and may not be directly accessible by the processor. However, as used herein, "main memory" does not necessarily have to be volatile memory and can, in some embodiments, be non-volatile memory.

Memory devices can be combined together to form a storage volume of a memory system such as a solid state drive (SSD). A solid state drive can include non-volatile memory (e.g., NAND flash memory and NOR flash memory), and/or can include volatile memory (e.g., DRAM and SRAM), among various other types of non-volatile and volatile memory. An SSD may have a controller with a robust amount of local primary storage to enable the SSD to perform relatively complicated memory management operations for the secondary storage compared to those memory management operations that may be performed by a less robust device, such as a mobile device.

Local primary storage for a controller is a limited and relatively expensive resource as compared to most secondary storage. A significant portion of the local primary storage of a controller may be dedicated to storing logical to physical tables that store logical address to physical address translations for logical addresses. A logical address is the address at which a memory unit (e.g., memory cell, sector of data, block of data, etc.) appears to reside from the perspective of an executing application program and may be an address generated by a host or processor. A physical address is a memory address that enables a data bus to access a particular unit of the physical memory, such as a memory cell, sector of data, block of data, etc.

DETAILED DESCRIPTION

Figure 1:
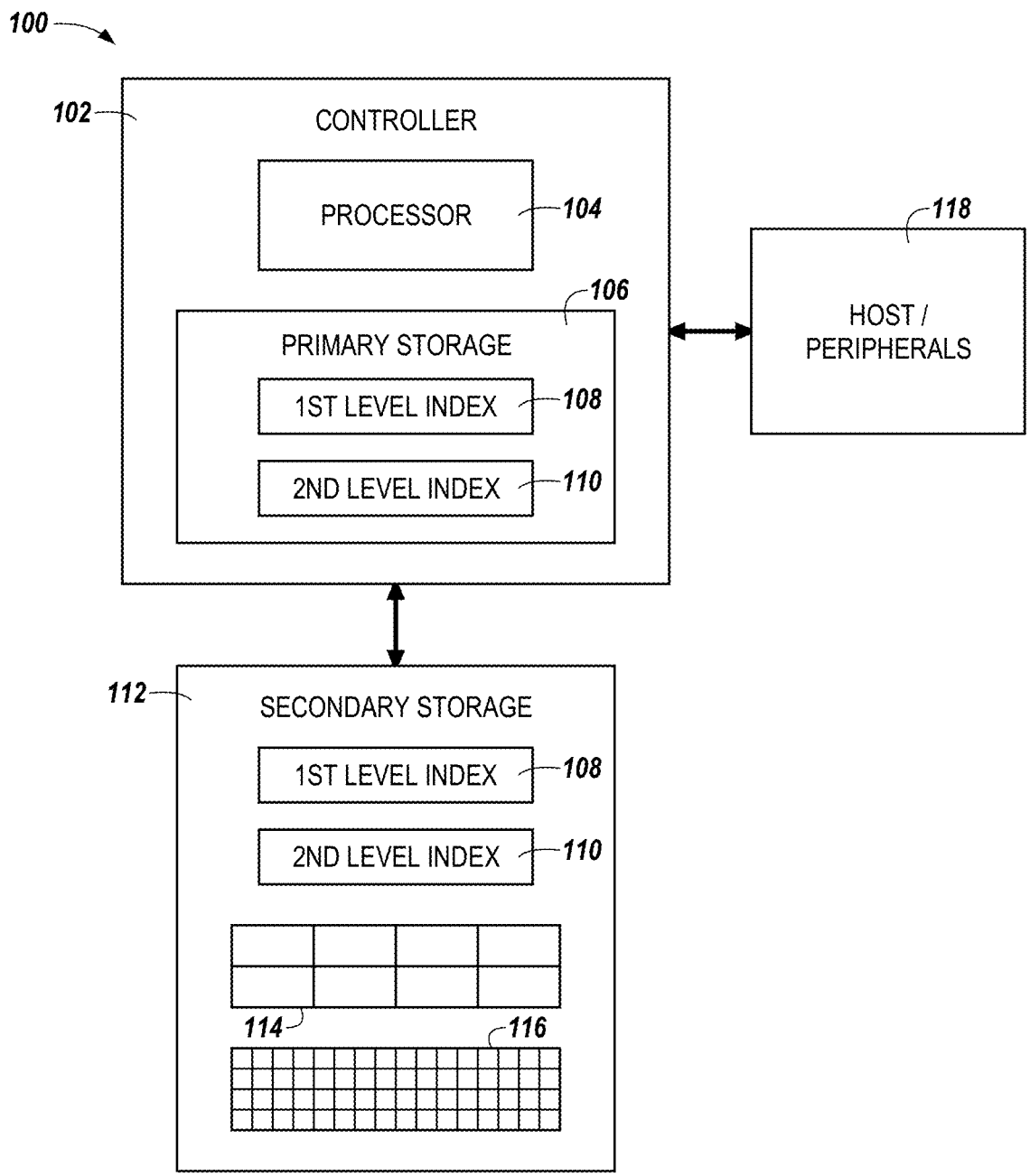
FIG. 1 is a block diagram of an apparatus in the form of a computing system including at least one memory system in accordance with a number of embodiments of the present disclosure.

The present disclosure is related to logical to physical table fragments. A number of embodiments of the present disclosure can reduce the amount of primary storage that would otherwise be required for a controller even in the case of large capacity memory devices. A number of embodiments of the present disclosure can provide logical to physical address translation with only a single read of secondary storage even for large capacity memory devices.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, "a number of" a particular thing can refer to one or more of such things (e.g., a number of memory devices can refer to one or more memory devices). As used herein, the terms "first" and "second" are used to differentiate between one feature from another and do not necessarily imply an order between the features so designated. For example, "a first physical address" does not necessarily imply that the first physical address came before "a second physical address."

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure, and should not be taken in a limiting sense.

FIG. 1 is a block diagram of an apparatus in the form of a computing system 100 including at least one memory system in accordance with a number of embodiments of the present disclosure. As used herein, a computing system 100, a memory system (generally including the primary storage 106 and the secondary storage 112), a controller 102, or a secondary storage 112 might also be separately considered an "apparatus." The computing system 100 can be a personal laptop computer, a desktop computer, a digital camera, a mobile telephone or other mobile device, a memory card reader, a storage device, or a memory controller, among various other types of computing systems 100. The computing system 100 can include a controller 102, which can include a processor 104 and/or other control circuitry and a number of memory devices that provide primary storage 106. For example, the primary storage can be SRAM. The controller 102 can be coupled to the primary storage 106 and to the secondary storage 112.

The processor 104 can be a cache-based processor and can include, for example, a processing unit (e.g., a central processing unit "CPU"), a first level cache coupled to the processing unit, a second level cache coupled to the first level cache, and a number of additional levels of cache coupled to the second level cache. Although not specifically illustrated, the first level cache, second level cache, and additional levels of cache may be referred to herein generically as cache. The cache may also be referred to as primary storage, which can be the same as or different than the primary storage 106 specifically illustrated in FIG. 1. Embodiments are not limited to a particular number of levels of cache and can include more or fewer than those mentioned above. The cache can be used by the processing unit to reduce average time to access the primary storage 106 and/or the secondary storage 112 by storing frequently used data. The latency for accessing the cache by the processing unit is less than the latency for accessing the primary storage 106 and/or the secondary storage 112.

As illustrated in FIG. 1, the controller 102 can be coupled to the secondary storage 112 via a number of channels and can be used to send data therebetween. The interface can be in the form of a standardized interface. For example, when the memory system is used for data storage in a computing system 100, the interface can be an interface that implements relatively simple protocols such as an open NAND flash interface (ONFI) or a double data rate (DDR) interface. In general, however, interface can provide an interface for passing control, address, data, and other signals between the memory system and the secondary storage 112 having compatible receptors for the interface. The controller 102 can communicate with the secondary storage 112 to control read, write, erase, move, and wear leveling, among other operations. The secondary storage 112 can be a plurality of memory arrays on a single die, a plurality of memory arrays on multiple dies, or a single memory array on a single die. The controller 102 can be embedded on the same die or a different die than any or all of the secondary storage 112. Likewise, the controller 102 can be embedded on the same die or a different die than any or all of the primary storage 106.

The secondary storage 112 can be flash arrays with a NAND architecture or a NOR architecture, for example. However, embodiments are not limited to a particular type of memory array or array architecture. Although floating-gate type flash memory cells in a NAND architecture are generally referred to herein, embodiments are not so limited. Other examples include electrically erasable programmable ROM (EEPROM), erasable programmable ROM (EPROM), ferroelectric RAM (FRAM), and resistance variable memory such as phase change random access memory (PCRAM), resistive random access memory (RRAM), magnetoresistive random access memory (MRAM), and 3D XPoint, among others.

The secondary storage 112 can include a number of arrays of memory cells (e.g., non-volatile memory cells). The memory cells can be grouped, for instance, into a number of blocks including a plurality of physical pages. A number of blocks can be included in a plane of memory cells and an array can include a number of planes.

As illustrated in FIG. 1, the controller 102 can be coupled to a host or a peripheral (generally identified by reference numeral 118 in FIG. 1) via a number of channels and can be used to send data therebetween. The interface can be in the form of a standardized interface. For example, when the memory system is used for data storage in a computing system 100, the interface can be an interface that implements relatively complex protocols such as a serial advanced technology attachment (SATA), peripheral component interconnect express (PCIe), or a universal serial bus (USB), among others. In general, however, interface can provide an interface for passing control, address, data, and other signals between the memory system and the host or peripheral 118 having compatible receptors for the interface.

In operation, data can be written to and/or read from the secondary storage 112 as a page of data, for example. As such, a page of data can be referred to as a data transfer size of the secondary storage 112. Data can be sent to/from the host or a peripheral 118 in data segments referred to as sectors (e.g., host sectors). As such, a sector of data can be referred to as a data transfer size of the host or peripheral. A sector size can be defined by a file system formatted to the secondary storage 112.

Read requests can originate from the host 118 and/or from the memory system, among other originations (e.g., from a direct memory access (DMA) device, which can also be identified as a peripheral 118). For example, a read request can originate from the memory system as part of a wear leveling operation. The memory system can implement wear leveling (e.g., garbage collection and/or reclamation) to control the wear rate on the secondary storage 112. A memory array can experience errors (e.g., failures) after a number of program and/or erase cycles. Wear leveling can reduce the number of program and/or erase cycles performed on a particular group by spreading the cycles more evenly over the entire array. For memory that is bit alterable, static and/or dynamic wear leveling can be used to distribute write operations across the entire array to avoid cycling some addresses much more often than others. For memory this is not bit alterable, dynamic wear leveling can be used to minimize the amount of valid blocks moved to reclaim a block. Dynamic wear leveling can include a technique called garbage collection for memory that is not bit alterable. Garbage collection can include reclaiming (e.g., erasing and making available for writing) blocks that have the most invalid pages (e.g., according to a "greedy algorithm"). Alternatively, garbage collection can include reclaiming blocks with more than a threshold amount of invalid pages. If sufficient free blocks exist for a writing operation, then a garbage collection operation may not occur. An invalid page, for example, can be a page of information that has been updated to a different page. Static wear leveling can include writing static information to blocks that have high erase counts to prolong the life of the block.

In a memory device, logical to physical "L2P" tables 114 provide the physical address (e.g., a physical block address "PBA") for each logical address (e.g., logical block address "LBA"). L2P tables 114 can be indexed in levels and are regularly moved for wear leveling purposes. For example, with NAND technology, an entire L2P table needs to be copied to update a single PBA, since the NAND media is not bit alterable. In some approaches, the L2P table can be indexed in levels such that a first level index 108 provides the physical address of a second level index 110. Because there are multiple L2P tables, in order to translate an LBA to a PBA, first the correct L2P table storing the translation must be located. The first level index 108 can be copied from secondary storage 112 (e.g., NAND) to primary storage 106 (e.g., SRAM) so that a PBA retrieval uses only a single medium read.

Table 1 shows an example of a 512 gigabyte (GB) memory device that would use a 512 kilobyte (KB) primary storage 106 for caching the first level index 108, however embodiments are not limited to a particular capacity:

TABLE 1

| Description | Value |
|---|---|
| Device Capacity | 512 GB |
| # of 4-KB Logical Block | 128 Mi (1 Mi = $1024^2$) |
| # of LBA in each L2P Table | 1024 |
| # of L2P Tables | 128 Ki (1 Ki = 1024) |
| Size of L2P table physical address | 4 bytes |
| Size of First Level Table | 512 KB |

Assuming a 4 KB block size, the full L2P table has 128 Mi entries. Some previous approaches may use a single level index that points directly to the various L2P tables that contain the PBAs for the various LBAs. However, embodiments of the present disclosure include both a first level index and a second level index. There are 16 Ki second level indices.

A 512 KB first level index is a large amount of data for many controllers to be able to store locally in primary storage 106. Only a minor portion of the LBAs are frequently written, which may also be referred to as updating the data associated with the LBA. These may be referred to as hot LBAs. According to at least one embodiment of the present disclosure, L2P table management can be improved using smaller tables for hot LBAs and larger tables for cold LBAs (logical addresses that are written less frequently). Tables with hot LBAs are moved often for wear leveling purposes. It is beneficial to have smaller tables for hot LBAs because it takes less time to copy a smaller table. Fragmenting an L2P table can allow hot LBAs to be stored in hot L2P table fragments. L2P table fragments 116 can be stored in a L2P table fragment area, which may have a higher over provisioning than the L2P table area for other L2P tables 114 to increase device lifetime. The primary storage 106 is generally a more expensive and more limited resource than the secondary storage 112. The entire first level index 108 can be copied to the primary storage 106. Additionally, some of the L2P tables 114 may be cached in the primary storage 106 to increase performance. The second level index 110 may be fully or partially copied to the primary storage 106. In random accesses, cache miss in both the first level index 108 and the second level index 110 are frequent. Therefore, two reads of the secondary storage 112 would be used to retrieve a PBA for an LBA (one for the second level index 110 and one for the L2P table 114 to retrieve the PBA). However, according to at least one embodiment of the present disclosure, the size of the primary storage 106 can be reduced even for a large capacity memory device while performing only a single read of the secondary storage 112 to retrieve a PBA for and LBA.

In contrast to Table 1, according to a number of embodiments of the present disclosure that include L2P table fragments, each L2P table can include 8192 entries, which can be addressed by LBA[12:0]. There are 16 Ki second level indices. The L2P table physical address can be referred to as the physical table address (PTA[14:0]). Each first level index entry contains a physical table address or a pointer to a second level index. There are 16,384 entries in the first level index, which are addressed by LBA[26:13]. If the secondary storage 112 is not bit alterable, every time an L2P table entry is written, the entire L2P table is copied to a different physical location. LBA that are often written can cause frequent L2P table copies. If the secondary storage 112 is bit alterable (such as 3D)(Point or phase change memory), the L2P table entries may be updated in place without copying the L2P table. However, at least one embodiment of the present disclosure includes updating L2P table entries "out of place" (e.g., by storing updated data at a different physical address as described in more detail herein) even for secondary storage 112 that is bit alterable. Such embodiments can advantageously provide better wear leveling. Since a small portion of the LBAs are updated frequently, it is useful to manage the related L2P entries in smaller tables. This can reduce the amount of L2P table copy operations, which increases performance and reduces cycling. Thus, according to a number of embodiments of the present disclosure, each L2P table can be divided into fragments (e.g., 16 fragments per L2P table, where each fragment contains 512 entries). The L2P tables 114 and L2P table fragments 116 can be stored in dedicated areas.

The physical blocks themselves, which are the subject of the PBAs and which may be used to store user data or system data, can be part of the secondary storage 112 illustrated in FIG. 1 and/or part of a different secondary storage (not specifically illustrated) that is also coupled to the controller 102. In some embodiments, some of the physical blocks can be part of the secondary storage 112 and some of the physical blocks can be part of the different secondary storage (not specifically illustrated). For example, the secondary storage 112 can comprise 3D)(Point memory and the different secondary storage comprises flash memory. In such embodiments, the flash memory may not store the L2P tables 114. Storing L2P table only in 3D XPoint and not in the flash memory can yield two advantages. First, performance can be improved because read and write accesses for small portions of memory are faster if they are performed by 3D XPoint. Second, endurance can be improved. Since 3D)(Point is bit alterable, the update of a single L2P pointer can be performed in place, avoiding the copy of the whole L2P table fragment.

Figure 2:
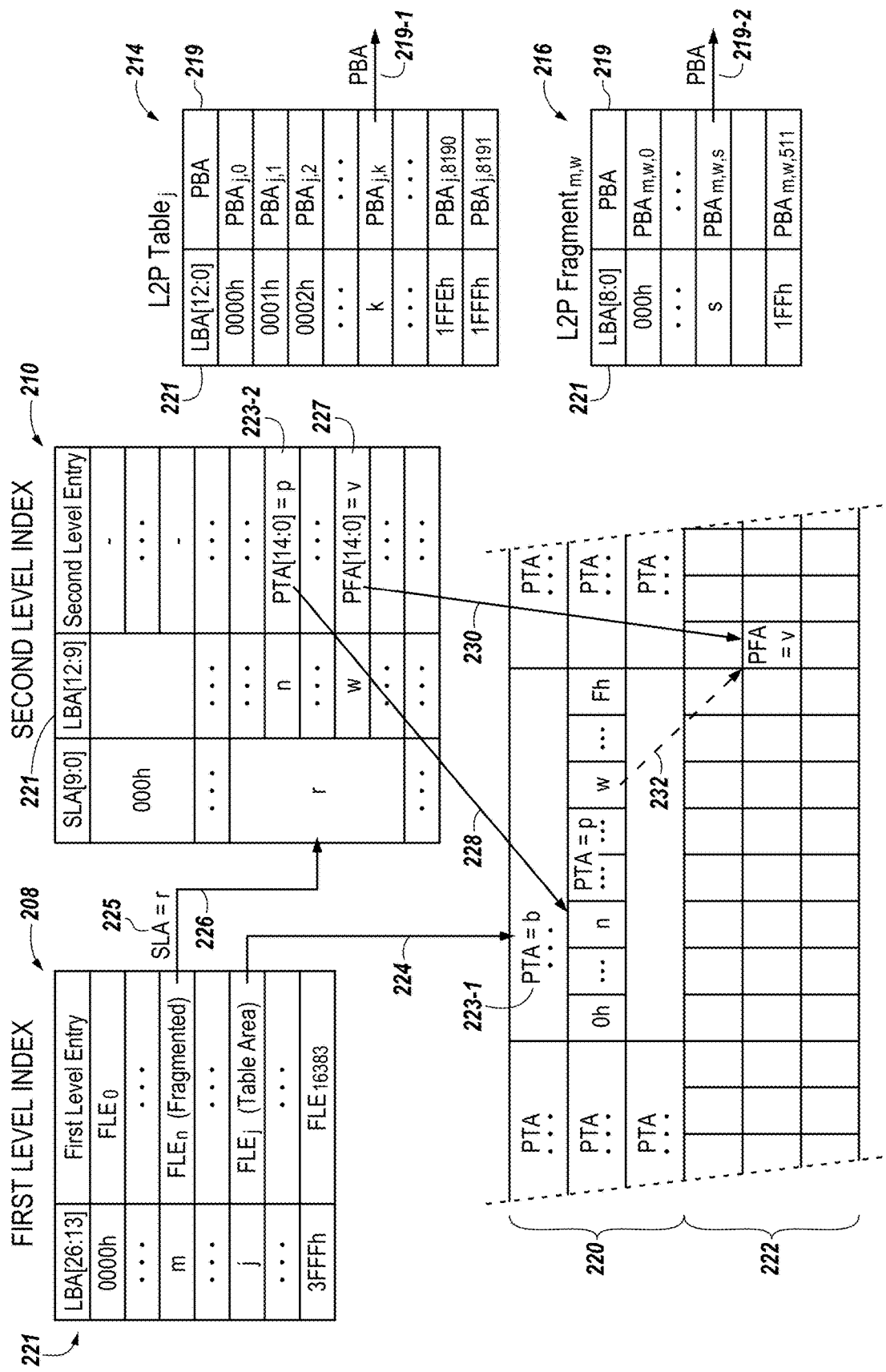
FIG. 2 is a block diagram of a logical to physical table area and a logical to physical table fragment area in accordance with a number of embodiments of the present disclosure.

FIG. 2 is a block diagram of a logical to physical table area 220 and a logical to physical table fragment area 222 in accordance with a number of embodiments of the present disclosure. (Non-fragmented) L2P tables 214 and L2P tables fragments 216 each store respective PBAs 219 for corresponding LBAs 221 (logical to physical address translations). For example, an L2P table 214 can store 8192 logical to physical address translations ("entries"). Entries can be updated when an LBA is written or unmapped. L2P tables 214 can be stored in the L2P table area 220. Access to an L2P table 214 can be achieved using the first level index 208.

Each L2P table can be fragmented, for example, into 16 fragments, such as L2P table fragment 216. Each L2P table fragment 216 can store 512 entries. The L2P table fragments 216 can be stored in the L2P table fragment area 222. Access to the L2P table fragment 216 can be achieved using the first level index 208 and the second level index 210. The first level index 208 and/or the second level index 210 can be stored in secondary storage and copied to primary storage, for example, at power up.

The L2P table fragment area 222 can be used to store a portion of an L2P table that includes hot (frequently written) LBAs 221. Some L2P tables can be fully stored in the L2P table area 220, while others are fragmented. For L2P tables that are fully stored in the L2P table area 220, the entry in the first level index 208 provides a physical table address 223-1 of an L2P table as shown by arrow 224 (for LBA[26:13] "j" the entry is "PTA=b", which points to the L2P table area 220). For fragmented L2P tables, the entry in the first level index 208 is a pointer 225 to the second level index 210 as shown by arrow 226 (for LBA[26:13] "m" the entry is "SLA=r", which points to the second level address (SLA) "r" in the second level index 210). The second level index 210 can indicate a physical fragment address of a respective logical to physical table fragment 216. The second level index 210 can store a physical fragment address that indicates a position in either the L2P table area 220 (as indicated by example physical table address 223-2 "PTA[14:0]=p" and as shown by arrow 228) or the L2P table fragment area 222 (as indicated by example physical fragment address 227 "PFA[14:0]=v" and as shown by arrow 230).

As described herein, an LBA can be hot or cold depending on the quantity of writes for the LBA over a measurement interval such as a period of time, a quantity of L2P table fragment moves, or another measurement interval. In the second level index 210, LBA[12:9] "w" has an associated physical fragment address 227 of "v", which is a physical fragment address in the L2P table fragment area 222 as indicated by the arrow 230. Arrow 232 indicates that LBA [12:9] "w" was previously cold and stored in the L2P table area 220. This is an example of a L2P table fragment being moved from the L2P table area 220 to the L2P table fragment area 222 in response to an LBA associated with the L2P table fragment changing from cold to hot, for example, in response to more than a hot threshold quantity of writes of data associated with the LBA over a measurement interval. The data associated with the LBA can be copied to the L2P table fragment area 222, a pointer to the second level index 210 can be added to the first level index 208 for the LBA, and the PTA of the L2P table stored in the first level index 208 for the LBA can be removed. Although not specifically illustrated, an L2P table fragment can change from hot to cold and be moved from the L2P table fragment area 222 to the L2P table area 220, for example, in response to less than a cold threshold quantity of writes of data associated with the LBA over a measurement interval. The data associated with the LBA can be copied from the L2P table fragment area 222 to a different physical address in the L2P table area 220, the pointer to the second level index 210 for the LBA can be removed from the first level index 208, and the PTA of the L2P table for the LBA can be added to the first level index 208.

The controller (e.g., controller 102 illustrated in FIG. 1) can be configured, in response to receiving a logical address 221 (e.g., a logical block address), to search the first level index 208 (in the primary storage) of logical to physical tables 214 using the logical address 221. The controller can be configured to retrieve, from a logical to physical table 214, a first physical address 219-1 (e.g., a physical block address) corresponding to the logical address 221 in response to finding a physical table address 223-1 of the logical to physical table 214 stored in the first level index 208 for the logical address 221. The controller can be configured to search a second level index 210 of logical to physical table fragments 216 in response to finding a pointer 225 to the second level index 210 stored in the first level index 208 for the logical address 221. The controller can be configured to retrieve, from a logical to physical table fragment 216, a second physical address 219-2 of the secondary storage corresponding to the logical address 221 in response to finding a physical fragment address 227 of the logical to physical table fragment 216 stored in the second level index for the logical address 221.

The controller can be configured to update data associated with the logical address 221 and stored at the first physical address 219-1 by storing the updated data at a different physical address 219. For example, the updated data can be stored in the medium that contains the logical to physical table 214 (e.g., secondary storage) or in a different medium. The logical to physical table 214 or a logical to physical table fragment 216 can be updated with the different physical address 219. The controller can also be configured to copy the logical to physical table 214 to a different physical location with a different physical table address 223 and update the first level index 208 with the different physical table address. The first level index 208 can have two copies (one in the primary storage and one in the secondary storage), both of which can be updated.

The controller can be configured to update data associated with the logical address 221 and stored at the second physical address 219-2 by storing the updated data at a different physical address 219. The controller can also be configured to copy the logical to physical table fragment 216 to a different physical location with a different physical fragment address and update the second level index 210 with the different physical fragment address. The second level index 210 can have two copies (one in the primary storage and one in the secondary storage), both of which can be updated.

In some embodiments, update of the data associated with the logical address may be performed "out of place" (e.g., by writing in a different physical block) regardless of the bit alterability of the secondary storage used to store the data. If the secondary storage is bit alterable (e.g. 3D XPoint), the update of the L2P table fragment with the new physical address can be performed "in-place" (rewriting the same physical block). If the secondary storage is not bit alterable (e.g. NAND Flash), the update of the L2P table fragment with the new physical address is performed "out-of-place" (copying the L2P table fragment to a different physical location). In the case of a secondary storage that is bit alterable, for wear leveling purposes, after an amount of rewrites, the L2P table fragment can be copied to a different physical location.

Figure 3:
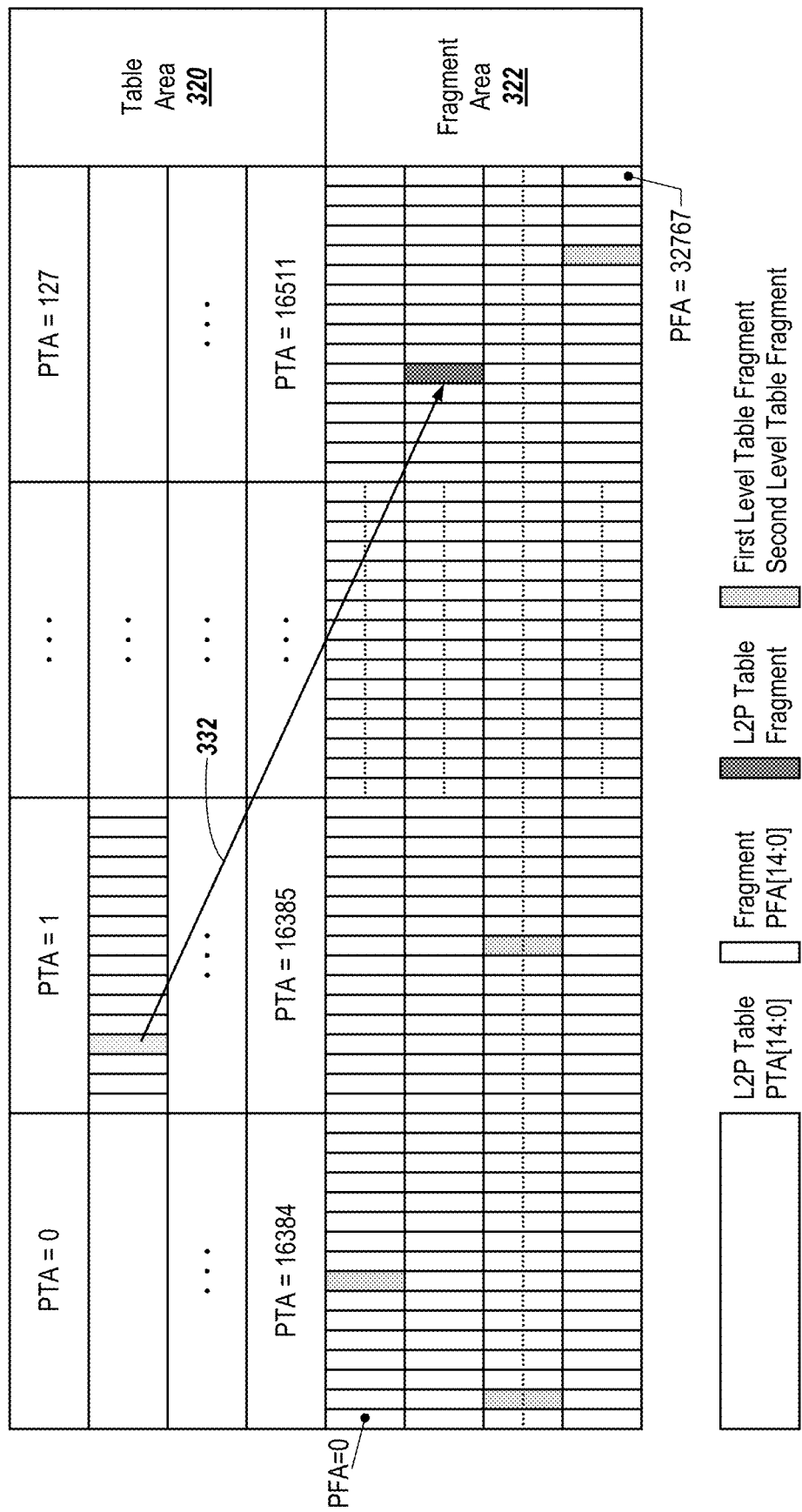
FIG. 3 is a block diagram of a layout of a logical to physical table area and a logical to physical table fragment area in accordance with a number of embodiments of the present disclosure.

FIG. 3 is a block diagram of a layout of a logical to physical table area 320 and a logical to physical table fragment area 322 in accordance with a number of embodiments of the present disclosure. The physical address of an L2P table is called a physical table address (PTA). In this example, there are 16,512 PTAs in the L2P table area 320. The physical address of an L2P table fragment is called a physical fragment address (PFA). In this example, there are 32,768 PFAs in the L2P table fragment area 322, each one identified by a PFA[14:0] value. The PFAs are provided in the second level index. For L2P tables that are fragmented, the first level index includes a pointer to the second level index, which contains the PFA. The granularity to which and L2P table can be fragmented is limited by the maximum number of entries stored or storable in the second level index.

A non-volatile copy of the first level index and/or the second level index can be stored in the L2P table fragment area 322 in addition to any L2P address translations stored therein. These tables can be cached in primary storage so that only one read of the secondary storage is required to retrieve a PBA. The first level index and the second level index are written much more rarely than the L2P tables because their entries are updated only when tables are moved.

An L2P table may be fragmented when the quantity of writes over a measurement interval reaches a fragmentation threshold. Arrow 332 indicates that a particular L2P table fragment was previously cold and stored in the L2P table area 320. This is an example of a L2P table fragment being moved from the L2P table area 320 to the L2P table fragment area 322 in response to an LBA associated with the L2P table fragment changing from cold to hot. Although not specifically illustrated, L2P table fragments can be moved from the L2P table fragment area 322 to the L2P table area 320 when they change from hot to cold. The difference between hot and cold LBAs or L2P table fragments can be determined by counting the quantity of writes over a measurement interval. If the quantity of writes is less than a cold threshold, then a hot L2P table fragment can be moved from the L2P table fragment area 322 to the L2P table area 320. If the quantity of writes is greater than a hot threshold, then a cold L2P table fragment can be moved from the L2P table area 320 to the L2P table fragment area 322.

Table 2 shows an example of a format that can be used for the first level index:

TABLE 2

| | Bit | | | | |
|---|---|---|---|---|---|
| | 15 | 14 | 13 | 12 | 11 10 ... 0 |
| Table Addressing | FTA = 1 | | | PTA[14:0] | |
| Fragment Addressing | FTA = 0 | SLI_TYPE[1:0] | | Reserved | SLA[9:0] |

The type of addressing used by the first level index is indicated by the first table addressing (FTA) bit (e.g., FTA=1 for Table Addressing or FTA=0 for Fragment Addressing). The FTA bit may be referred to as a fragmentation indicator. An FTA bit set to 1 specifies that the L2P table is not fragmented and that the first level entry contains its PTA. A FTA bit set to 0 specifies that the L2P table is fragmented and its physical table address is specified in the second level index. The first level entry provides a second level index (SLI) type indicator and a second level address (SLA). Entries in the second level index are called second level entries (SLE). In order to reduce the second level index size and therefore the size of the primary storage, three second level index types are defined with variable sizes as shown in Table 3:

TABLE 3

| SLI_TYPE[1:0] | Description | SLE size |
|---|---|---|
| 00 | Reserved | — |
| 01 | Type-1 | 5 bytes |
| 10 | Type-2 | 8 bytes |
| 11 | Type-3 | 32 bytes |

Table 4 shows the SLI type-1 format, which can be used for L2P tables with only one fragment stored in the L2P table fragment area 322:

TABLE 4

| | Bit | | | | | | | |
|---|---|---|---|---|---|---|---|---|
| Byte | 7 | 6 | 5 | 4 | 3 | 2 | 1 | 0 |
| 0 | R | | | | | | | |
| 1 | | | | PTA[14:0] | | | | |
| 2 | | FRAG[3:0] | | | | Reserved | | |
| 3 | R | | | | | | | |
| 4 | | | | PFA[14:0] | | | | |

The FRAG[3:0] field specifies the index of the fragment stored in the L2P table fragment area 322, while the PFA field specifies its physical address. The other 15 table fragments are stored in the L2P table area 320 at the PTA indicated by the PTA field.

Table 5 shows the SLI type-2 format that is used for L2P tables with only two fragments stored in the L2P table fragment area:

TABLE 5

| Byte | Bit | | | | | | | |
|---|---|---|---|---|---|---|---|---|
| | 7 | 6 | 5 | 4 | 3 | 2 | 1 | 0 |
| 0 | R | | | | | | | |
| 1 | | | | PTA[14:0] | | | | |
| 2 | | FRAG_A[3:0] | | | | Reserved | | |
| 3 | R | | | | | | | |
| 4 | | | | PFA_A[14:0] | | | | |
| 5 | | FRAG_B[3:0] | | | | Reserved | | |
| 6 | R | | | | | | | |
| 7 | | | | PFA_B[14:0] | | | | |

In this case, the index of the two L2P table fragments stored in the L2P table fragment area 322 are provided by the FRAG_A[3:0] field and the FRAG_B[3:0] field. The related PFA fields specify their physical address. The other 14 table fragments are stored in the L2P table area 320 at the PTA indicated by the PTA fields.

Table 6 shows the SLI type-3 format that is used for L2P tables with more than two fragments stored in the L2P table fragment area 322:

TABLE 6

| Byte | Bit | | | | | | | |
|---|---|---|---|---|---|---|---|---|
| | 7 | 6 | 5 | 4 | 3 | 2 | 1 | 0 |
| 0 | STA_0 | | | | | | | |
| 1 | | | PTA_0[14:0] or PFA_0[14:0] | | | | | |
| 2 | STA_1 | | | | | | | |
| 3 | | | PTA_1[14:0] or PFA_1[14:0] | | | | | |
| ... | | | ... | | | | | |
| 30 | STA_15 | | | | | | | |
| 31 | | | PTA_15[14:0] or PFA_15[14:0] | | | | | |

The SLI contains a 2-byte entry for each L2P table fragment. The second table addressing (STA) bit indicates whether the L2P fragment is stored in the L2P table area 320 or in the L2P table fragment area 322. An STA bit set to 0 specifies that the L2P table fragment is stored in the L2P table fragment area 322 and the remaining entry bits provide the PFA.

Figure 4:
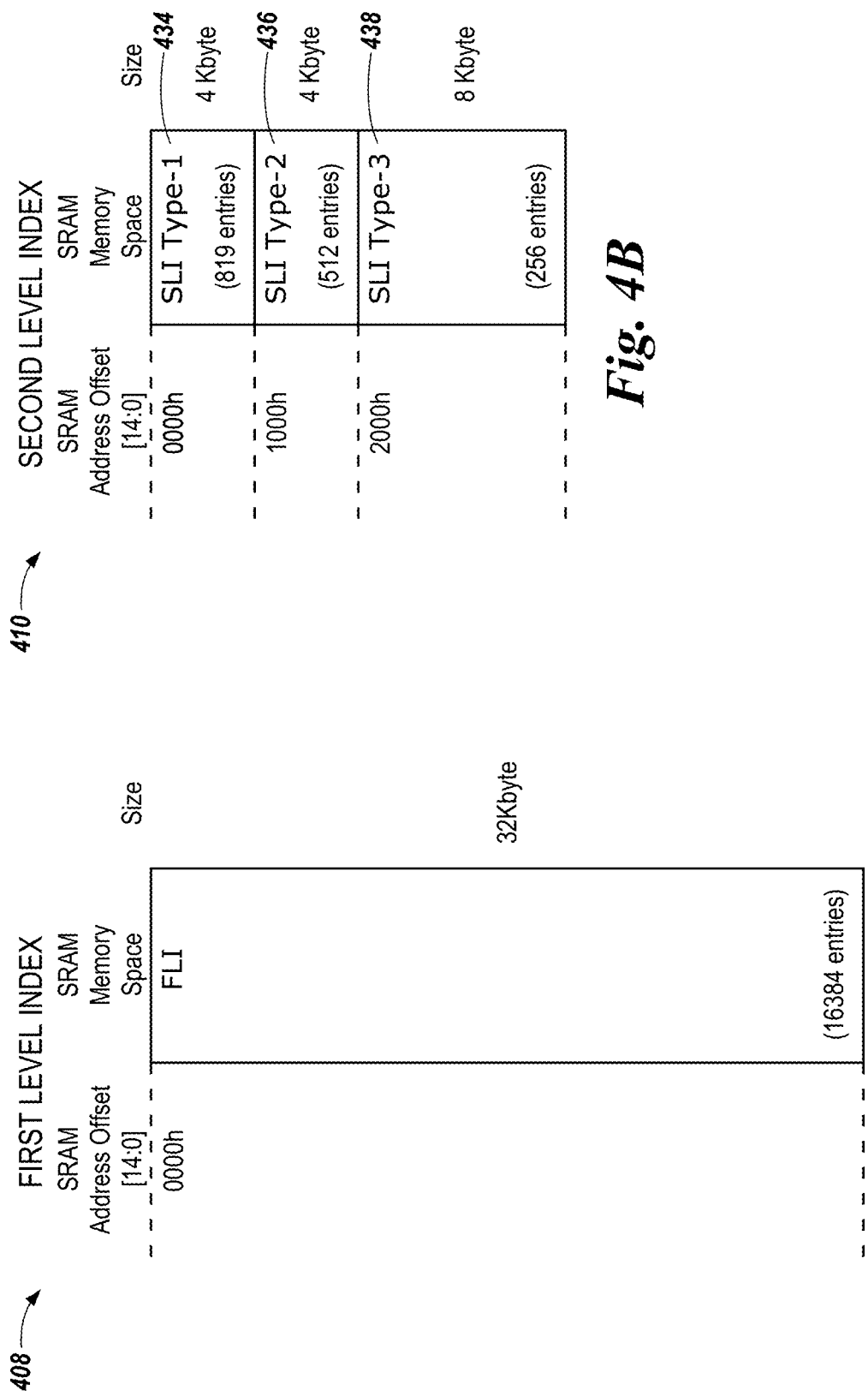
FIG. 4A is a block diagram of a first level index in accordance with a number of embodiments of the present disclosure.
FIG. 4B is a block diagram of a second level index in accordance with a number of embodiments of the present disclosure.

FIG. 4A is a block diagram of a first level index 408 in accordance with a number of embodiments of the present disclosure. The size of the first level index 408 is 32 KB, for example, and contains 16,384 2-byte entries.

FIG. 4B is a block diagram of a second level index 410 in accordance with a number of embodiments of the present disclosure. The second level index 410 is divided into three areas for three different second level index types. The size of the second level index 410 is 16 KB: 4 KB for 819 second level index type-1 entries 434, 4 KB for 512 second level index type-2 entries 436, and 8 KB for 256 second level index type-3 entries 438. The second level index type-3 entries 438 may be preferable in terms of functionality, but they also take up the most space. Firmware on the controller can reformat the primary storage to change the breakdown between the different second level index type entries.

Figure 5:
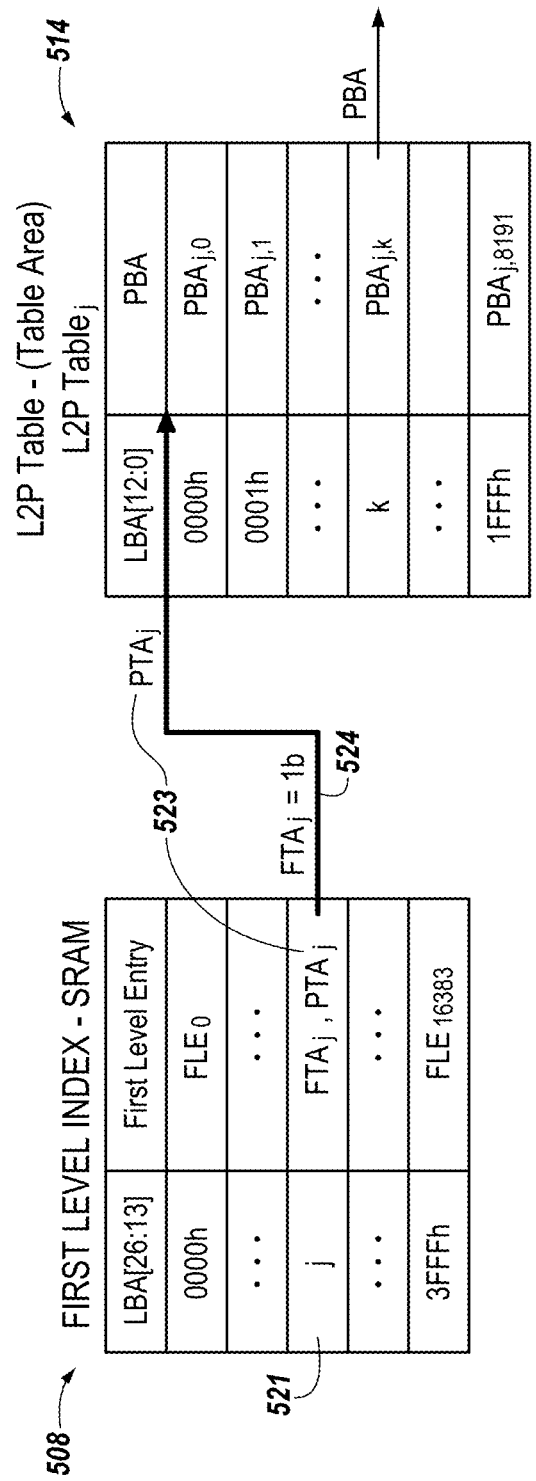
FIG. 5 is a block diagram illustrating first level index addressing in accordance with a number of embodiments of the present disclosure.

FIG. 5 is a block diagram illustrating first level index addressing in accordance with a number of embodiments of the present disclosure. The PTA 523 "PTA" for and LBA 521 "j" is retrieved from the first level index 508. The PTA 523 indicates the physical location where the L2P table 514 is stored in the medium as shown by arrow 524.

Figure 6:
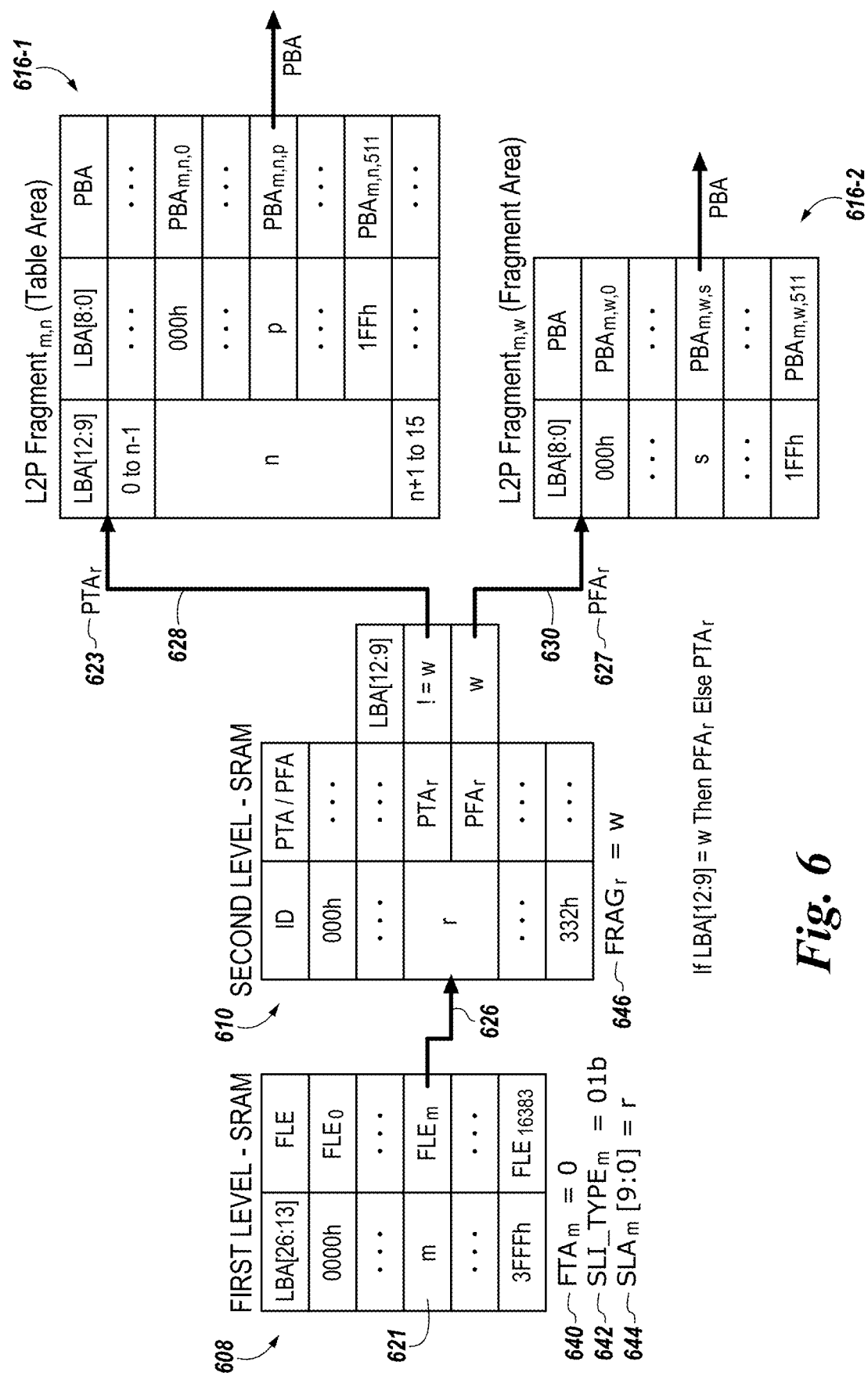
FIG. 6 is a block diagram illustrating a first type of second level index addressing in accordance with a number of embodiments of the present disclosure.

FIG. 6 is a block diagram illustrating a first type of second level index addressing in accordance with a number of embodiments of the present disclosure. Fragment addressing can be used when an L2P table is fragmented. As described herein, some L2P table fragments may be stored in the L2P table area and some may be stored in the L2P table fragment area. Access to both the first level index 608 and the second level index 610 is used to retrieve the physical fragment address 627. Physical fragment addresses 627 are stored in the second level index 610.

By way of example, consider an LBA 621 "LBA[26:13] =m". The first level entry "$FLE_m$" is retrieved from the first level index 608 in association with the LBA 621. In this case, the first level entry is a pointer to the second level index 610 as shown by arrow 626. The FTA bit 640 in FLEW is set to 0, therefore an access to the second level index 610 is needed. The second level index type bits 642 ($FLE_m$[14:13]) specify the second level index type-1 "01b", and the SLA bits 644 ($FLE_m$[9:0]) identify the entry "r" in the type-1 area of the second level index 610. The index 646 of the L2P table fragment is FRAG=w, therefore the L2P table fragment 616-2 corresponding to LBA[12:9]=w is stored in the L2P table fragment area at $PFA_r$ 627 as indicated by arrow 630, while the other L2P table fragments 616-1 are in the L2P table area at $PTA_r$ 623 as indicated by arrow 628.

Figure 7:
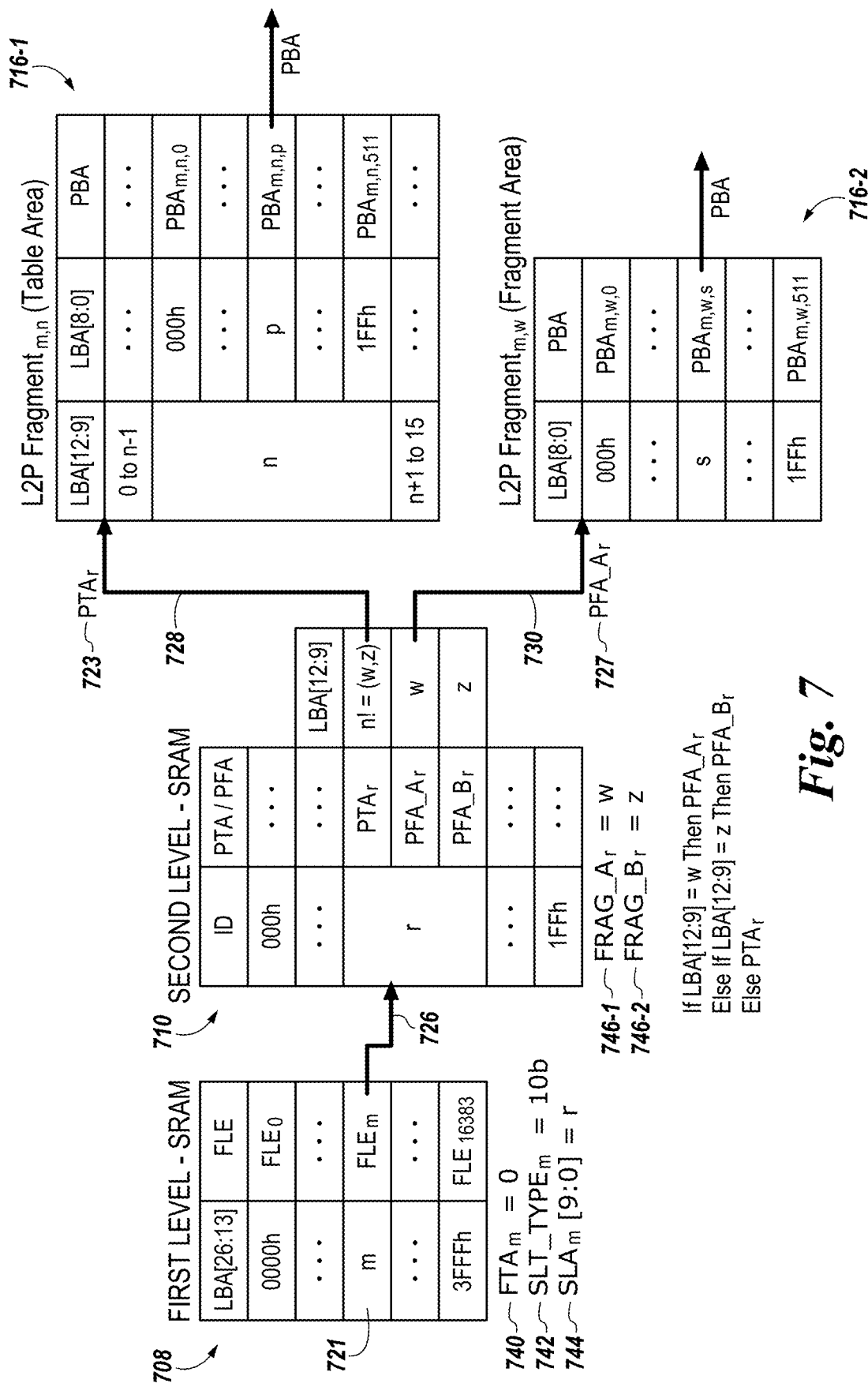
FIG. 7 is a block diagram illustrating a second type of second level index addressing in accordance with a number of embodiments of the present disclosure.

FIG. 7 is a block diagram illustrating a second type of second level index addressing in accordance with a number of embodiments of the present disclosure. By way of example, consider an LBA 721 "LBA[26:13]=m". The first level entry "$FLE_m$" is retrieved from the first level index 708 in association with the LBA 721. In this case, the first level entry is a pointer to the second level index 710 as shown by arrow 726. The FTA bit 740 in FLEW is set to 0, therefore an access to the second level index 710 is needed. The second level index type bits 742 ($FLE_m$[14:13]) specify the second level index type-2 "10b", and the SLA bits 744 ($FLE_m$[9:0]) identify the entry "r" in the type-2 area of the second level index 710. There are two L2P table fragments 716-2 stored in the L2P table fragment area. The index 746-1 of the first L2P table fragment is $FRAG\_A_r$=w and the index 746-2 of the second L2P table fragment is $FRAG\_B_r$=z. If LBA[12:9]=w, the physical fragment address is $PFA\_A_r$ 727 as indicated by arrow 730. If LBA[12:9]=z, the physical fragment address is $PFA B_r$ (not specifically illustrated). The other 14 L2P table fragments 716-1 are stored in the L2P table area at $PTA_r$ 723 as indicated by arrow 728.

Figure 8:
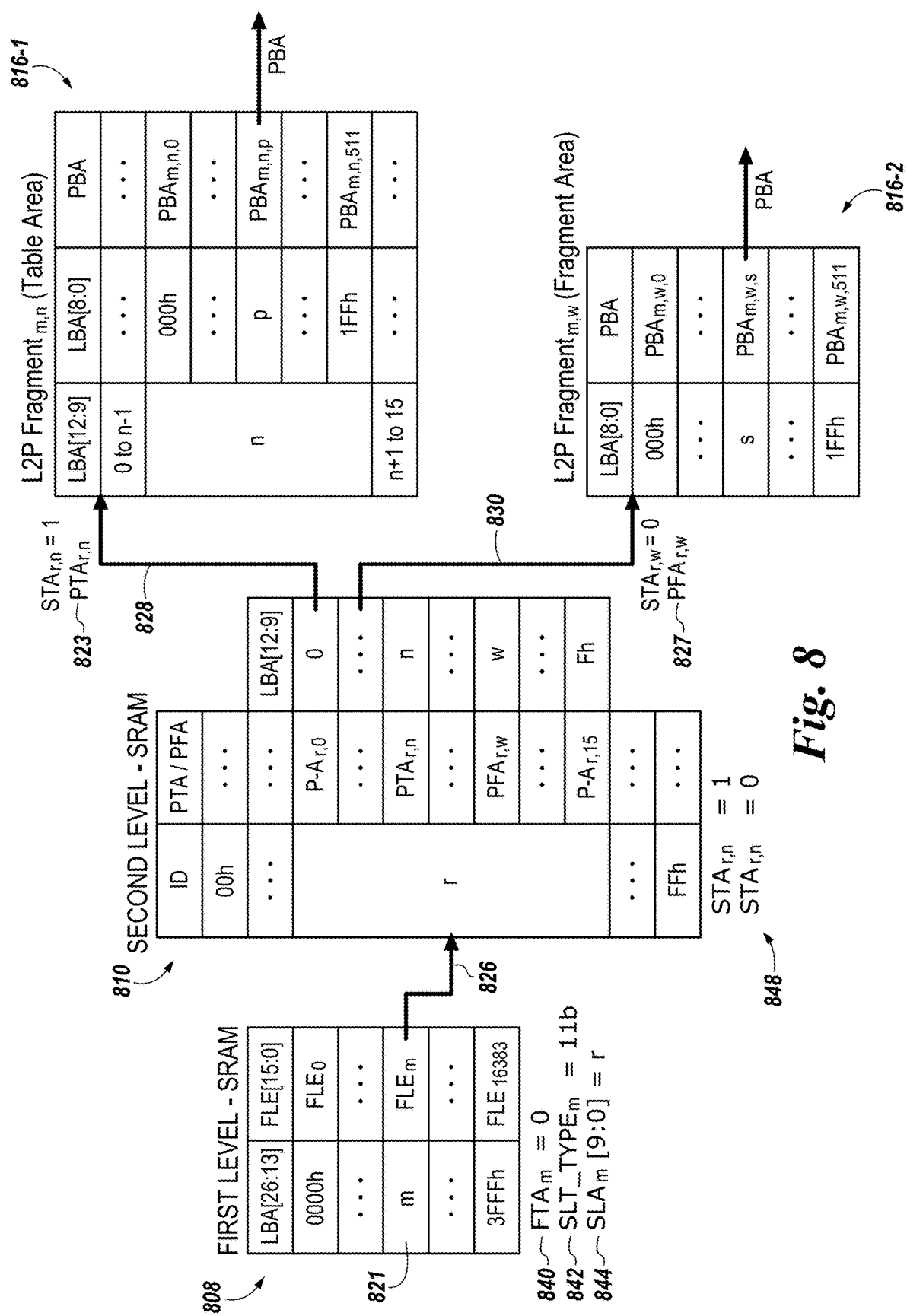
FIG. 8 is a block diagram illustrating a third type of second level index addressing in accordance with a number of embodiments of the present disclosure.

FIG. 8 is a block diagram illustrating a third type of second level index addressing in accordance with a number of embodiments of the present disclosure. By way of example, consider an LBA 821 "LBA[26:13]=m". The first level entry "$FLE_m$" is retrieved from the first level index 808 in association with the LBA 821. In this case, the first level entry is a pointer to the second level index 810 as shown by arrow 826. The FTA bit 840 in FLEW is set to 0, therefore an access to the second level index 810 is needed. The second level index type bits 842 ($FLE_m$[14:13]) specify the second level index type-3 "11b", and the SLA bits 844 ($FLE_m$[9:0]) identify the entry "r" in the type-3 area of the second level index 810. The second level index 810 includes a physical address for each LBA[12:9] value. If the STA bit 848 is set to 1, the L2P table fragment 816-1 is stored in the L2P table area as indicated by arrow 828 and $SLE_{m,n}$[14:0] specifies the PTA 823. If the STA bit 848 is set to 0, the L2P table fragment 816-2 is stored in the L2P table fragment area as indicated by arrow 830 and $SLE_{m,n}[14:0]$ specifies the PFA 827.

Figure 9:
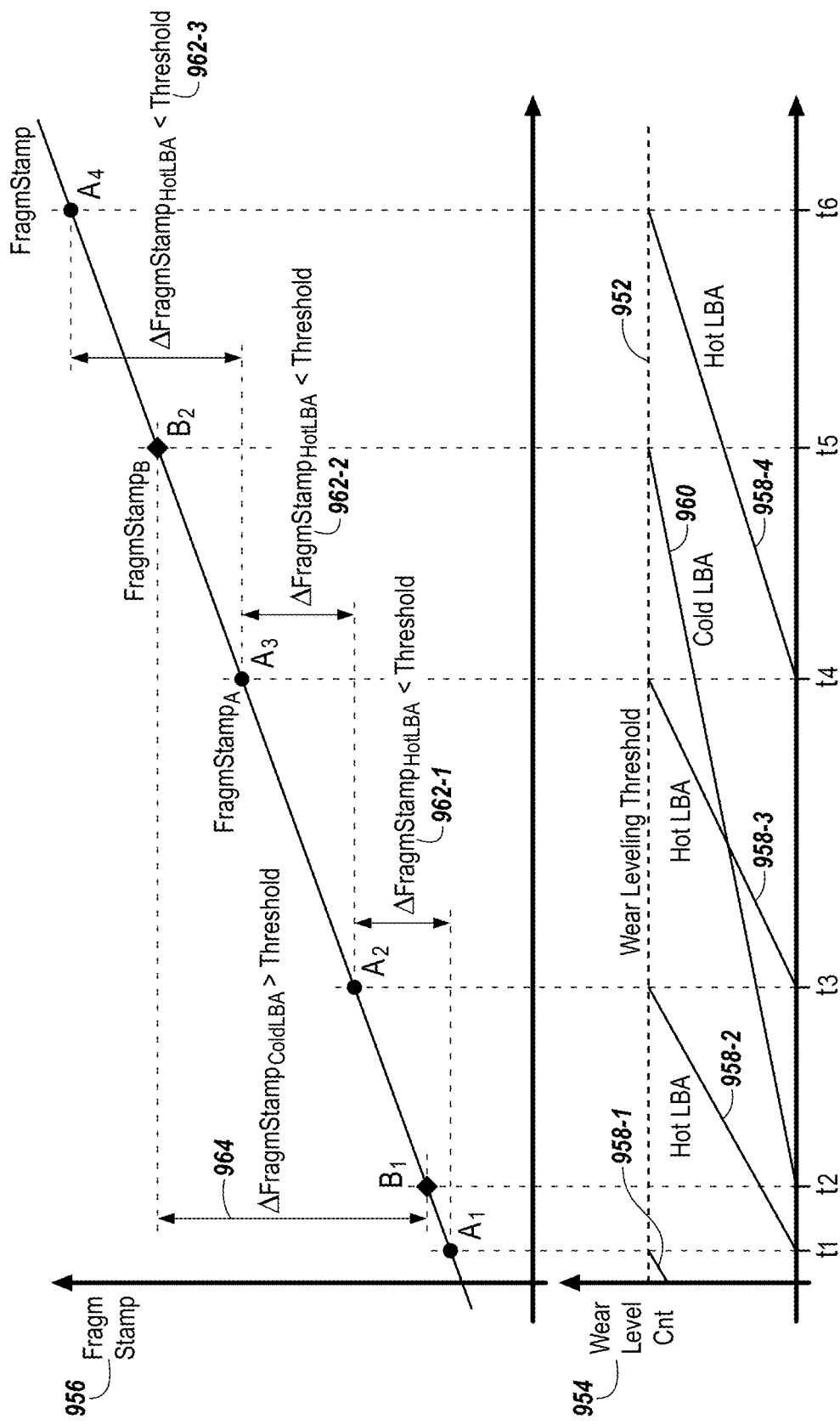
FIG. 9 is a timeline illustrating a measurement interval for hot and cold logical to physical table fragments in accordance with a number of embodiments of the present disclosure.

FIG. 9 is a timeline 950 illustrating a measurement interval for hot and cold logical to physical table fragments in accordance with a number of embodiments of the present disclosure. A hot L2P table fragment is an L2P table fragment that includes at least one hot LBA or group of contiguous LBAs. Each LBA or group of contiguous LBAs can have a wear leveling counter 954 that is incremented for each LBA write. A subsequent write to a particular LBA is also referred to herein as an update. When the wear leveling counter 954 reaches a threshold 952, the L2P table or L2P table fragment is moved to a different physical location and the wear leveling counters for the LBAs associated with the L2P table or L2P table fragment are reset to zero. An indication of when a previous move occurred can be stored in the L2P table or L2P table fragment metadata. The counter can be a monotonic counter incremented at each move.

In the case of a L2P table move, a fragment stamp 956 is incremented by the amount of L2P table fragments that comprise the L2P table. When an L2P table or and L2P table fragment is moved, the current fragment stamp 956 value is copied into the metadata. This value indicates when the L2P table or L2P table fragment has been moved. When an L2P table with a hot L2P table fragment is moved, the controller can check to see if the L2P table fragment is still hot and merge it back into the L2P table if it has gone cold, meaning that the previously hot L2P table fragment can be stored in the table area with the L2P table rather than being stored in the L2P table fragment area.

FIG. 9 includes a graph of the wear leveling counter 954 and a fragment stamp 956 for a hot LBA 958 and a cold LBA 960. The wear leveling counter 954 for the hot LBA 958 reaches a wear leveling threshold 952 at time t1 as indicated by 958-1. The wear leveling counter for the hot LBA 958 reaches the wear leveling threshold 952 at time t3 as indicated by 958-2, which corresponds to a range between fragment stamps $A_1$ and $A_2$. Since the period of time t3-t1 is short, the table is considered hot and the fragment that the hot LBA belongs to is moved into the L2P table fragment area if it was previously in the L2P table area. The wear leveling counter for the hot LBA 958 reaches the wear leveling threshold 952 at time t4 as indicated by 958-3, which corresponds to a range between fragment stamps $A_2$ and $A_3$. The wear leveling counter for the hot LBA 958 reaches the wear leveling threshold 952 at time t6 as indicated by 958-4, which corresponds to a range between fragment stamps $A_3$ and $A_4$.

LBAs that are considered hot can be compared to a cold threshold to determine whether they have gone cold. LBAs that are considered cold can be compared to a hot threshold to determine whether they have gone hot. In either case, if the threshold is exceeded, it indicates that the status of the LBA has changed (from cold to hot or vice versa). Exceeding the threshold means that the value is either greater than the threshold or less than the threshold depending on what the measurement interval is measuring, what the threshold is comparing, and whether the consideration is from hot to cold or from cold to hot. For example, if the measurement interval is time and the threshold is a quantity of writes over the period of time, then exceeding the threshold in a positive direction (having "too many" writes over the period of time) would indicate that the LBA is hot, and then exceeding the threshold in a negative direction (having "too few" writes over the period of time) would indicate that the LBA is cold. As another example, if the measurement interval is an interval between wear leveling moves and the threshold is a quantity of L2P table fragments moved, then exceeding the threshold in a positive direction (having "too many" L2P table fragments moved over the interval between wear leveling moves) would indicate that the LBA is cold, and then exceeding the threshold is a negative direction (having "too few" L2P table fragments moved over the interval between wear leveling moves) would indicate that the LBA is hot. This second example is illustrated in FIG. 9.

In some embodiments, the fragment stamp value can be used in place of time because the absolute time might not always be available. As indicated at 962-1, the change in fragment stamp value between fragment stamps $A_1$ and $A_2$ is less than a threshold for the hot LBA so the LBA is still considered hot. As indicated at 962-2, the change in fragment stamp value between fragment stamps $A_2$ and $A_3$ is less than the threshold for the hot LBA so the LBA is still considered hot. As indicated at 962-3, the change in fragment stamp value between fragment stamps $A_3$ and $A_4$ is less than the threshold for the hot LBA so the LBA is still considered hot. If, however, any of the changes in fragment stamp value between the "A" fragment stamps was greater than the threshold, the LBA would be considered cold. An example of such a cold LBA is illustrated at 964.

The wear leveling counter for the cold LBA 960 reaches the wear leveling threshold 952 at time t5. As indicated at 964, the change in fragment stamp value is greater than the threshold, therefore L2P table associated with the cold LBA 960 is still considered cold and will remain in the L2P table area. In some embodiments the value of the hot threshold can be the same as the value of the cold threshold. In some embodiments, the value of the hot threshold can be different than the value of the cold threshold. In some embodiments, the values of the hot and cold thresholds can be adjusted based on workload. For example, if it is desired to increase or decrease the relative amount of L2P table fragments, one or both of the thresholds can be adjusted.

The present disclosure includes methods and apparatuses for improving L2P table management using smaller L2P tables for LBA ranges that are frequently written and larger tables for the others. Although L2P tables with hot LBAs are moved often for wear leveling purposes, their copy is faster if the tables are smaller. Hot L2P table fragments can be stored in the L2P table fragment area and may be overprovisioned. Embodiments of the present disclosure may also be used to improve copying of large tables and/or to provide redundancy of large tables.

Wear leveling techniques can move L2P tables to equally age the physical space. If L2P tables are large, the time to copy may be long ($t_{Tablecopy}$). For many devices, once a table copy has been initiated, it cannot be suspended. However, the L2P table may be divided into L2P table fragments and each L2P table fragment may be moved individually. The time to copy an L2P table fragment is $t_{FragmentCopy} = t_{TableCopy}$ (# of fragments). The L2P table copy can be suspended after any L2P table fragment has been copied. The L2P table copy can be suspended after copying only a portion of the L2P address translations corresponding to an integer quantity of L2P table fragments.

Figure 10:
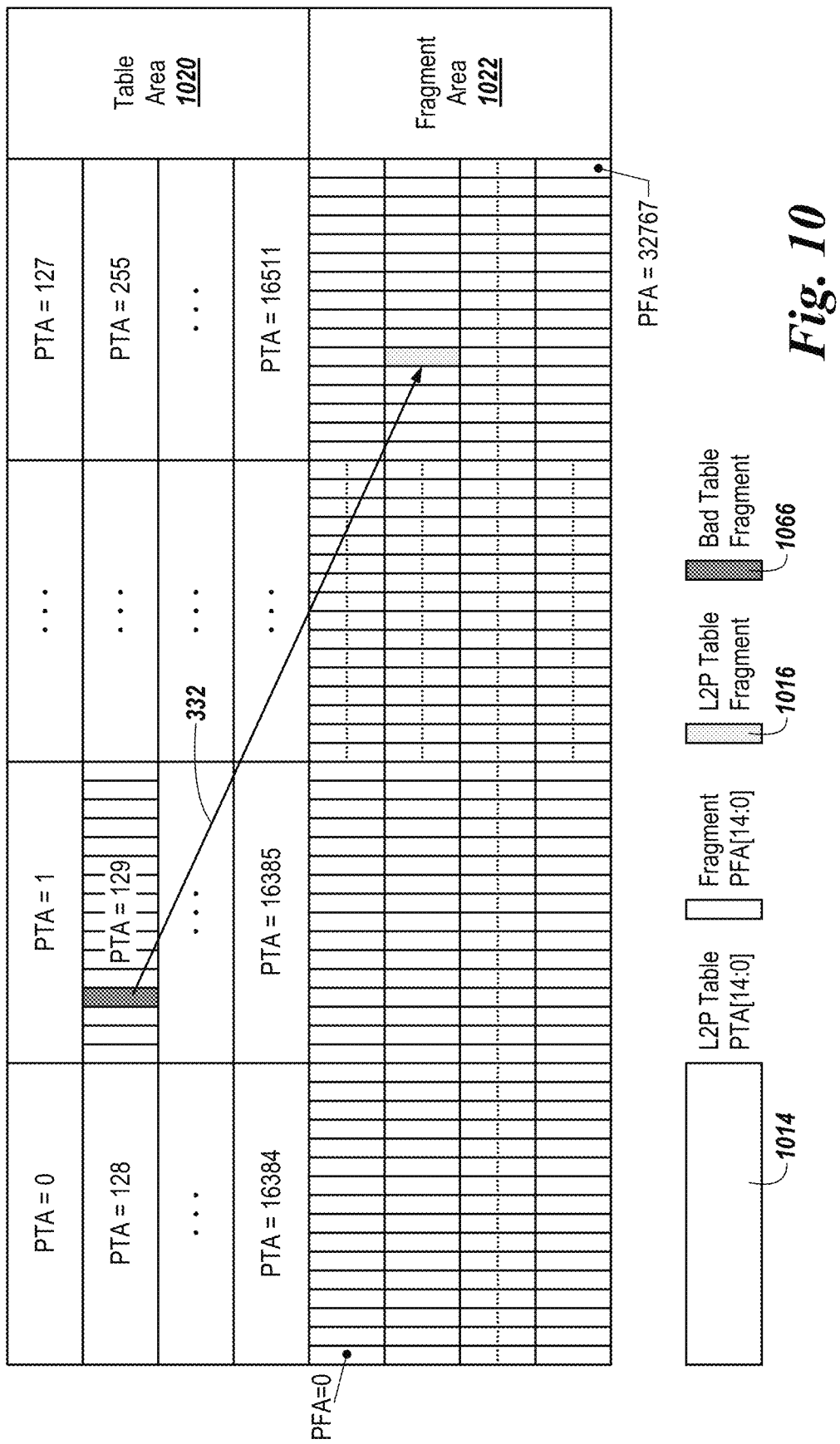
FIG. 10 is a block diagram of redundant logical to physical table fragments in accordance with a number of embodiments of the present disclosure.

FIG. 10 is a block diagram of redundant logical to physical table fragments in accordance with a number of embodiments of the present disclosure. If a portion of a large L2P table 1014 is no longer reliable, the L2P table fragment 1066 that contains the unreliable portion may be substituted with an L2P table fragment 1016 from the L2P table fragment area 1022. A write counter can track a quantity of writes for each portion of an L2P table 1014. A portion of the L2P table 1014 may be retired and substituted with an L2P table fragment 1016 when the counter reaches a predefined limit.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
   storing a plurality of logical to physical tables in secondary storage, each including logical to physical address translations for first logical addresses;
   storing a plurality of logical to physical table fragments in a dedicated area of the secondary storage, each including logical to physical address translations for second logical address;
   storing a first level index in the secondary storage, the first level index including:
      a physical table address of a respective one of the plurality of logical to physical tables for each of the first logical addresses; and
      a respective pointer to a second level index for each of the second logical addresses;
   storing, in secondary storage, the second level index including a physical fragment address of a respective logical to physical table fragment for each of the second logical addresses;
   caching the first level index and the second level index;
   fragmenting one of the plurality of logical to physical tables in response to physical media of the table becoming unreliable;
   updating the first level index to include a particular pointer to the second level index for the one of the plurality of logical to physical tables; and
   updating the second level index to include a physical fragment address of a fragment from a second dedicated area for the particular pointer.

2. The method of claim 1, wherein the first logical addresses comprise cold logical addresses; and
   wherein the second logical addresses include hot logical addresses and cold logical addresses.

3. The method of claim 1, wherein storing the plurality of logical to physical table fragments comprises storing in a first dedicated area of the secondary storage; and
   wherein storing the plurality of logical to physical table fragments comprises:
      storing a respective first portion of each of the plurality of logical to physical table fragments in the first dedicated area of the secondary storage; and
      storing a respective second portion of each of the plurality of logical to physical table fragments in a second dedicated area of the secondary storage.

4. The method of claim 3, wherein storing the first level index and the second level index comprises storing the first level index and the second level index in the second dedicated area of the secondary storage.

5. The method of claim 3, further comprising:
   counting a respective quantity of writes to each of the logical address over a measurement interval;
   moving a particular logical to physical table fragment from the second dedicated area to the first dedicated area in response to those of the quantity of writes associated with the particular logical to physical table fragment exceeding a cold threshold quantity of writes over the measurement interval.

6. The method of claim 3, further comprising:
   counting a respective quantity of writes to each of the logical address over a measurement interval;
   moving a particular logical to physical table fragment from the first dedicated area to the second dedicated area in response to those of the quantity of writes associated with the particular logical to physical table fragment exceeding a hot threshold quantity of writes over the measurement interval.

7. A method, comprising:
   in response to receiving a logical address:
      searching a first level index in primary storage of logical to physical tables using the logical address;
      retrieving, from a logical to physical table, a first physical address of secondary storage corresponding to the logical address in response to finding a physical table address of the logical to physical table stored in the first level index for the logical address;
      searching a second level index of logical to physical table fragments in response to finding a pointer to the second level index stored in the first level index for the logical address;
      retrieving, from a logical to physical table fragment, a second physical address of the secondary storage corresponding to the logical address in response to finding a physical fragment address of the logical to physical table fragment stored in the second level index for the logical address; and
      in response to the physical table address of the logical to physical table being stored in the first level index for the logical address; and
      in response to more than a hot threshold quantity of writes of data associated with the logical address over a measurement interval:
         copying the data associated with the logical address to the second physical address of the secondary storage;
         adding, to the first level index, the pointer to the second level index for the logical address; and
         removing the physical table address of the logical to physical table stored in the first level index for the logical address.

8. The method of claim 7, wherein the method includes storing the first level index and the second level index in the secondary storage and a copy of the first level index and the second level index in the primary storage.

9. The method of claim 8, wherein the method includes storing data associated with the logical address in the secondary storage or in a different secondary storage.

10. The method of claim 7, wherein the method includes:

updating data associated with the logical address and stored at the second physical address of the secondary storage by storing the updated data at a different physical address in the secondary storage;

updating the logical to physical table fragment with the new physical address; and copying the logical to physical table fragment to a different physical location with a different physical fragment address and update the logical to physical table fragment with the different physical fragment address.

11. The method of claim 7, wherein the method includes:

updating data associated with the logical address and stored at the first physical address of the secondary storage by storing the updated data at a different physical address in the secondary storage;

updating the logical to physical table fragment with the new physical address; and copying the logical to physical table to a different physical location with a different physical table address and update the logical to physical table with the different physical table address.

12. An apparatus, comprising:

storage; and a controller coupled to the storage and configured to:

store a plurality of logical to physical tables in secondary storage, each including logical to physical address translations for first logical addresses;

store a plurality of logical to physical table fragments in a first dedicated area of the secondary storage, each including logical to physical address translations for second logical address;

store a first level index in the secondary storage, the first level index including:

a physical table address of a respective one of the plurality of logical to physical tables for each of the first logical addresses; and a respective pointer to a second level index for each of the second logical addresses;

store the second level index in the secondary storage, the second level index including a physical fragment address of a respective logical to physical table fragment for each of the second logical addresses; and cache the first level index and the second level index in primary storage;

fragment one of the plurality of logical to physical tables in response to physical media of the table becoming unreliable;

update the first level index to include a particular pointer to the second level index for the one of the plurality of logical to physical tables; and update the second level index to include a physical fragment address of a fragment from the second dedicated area for the particular pointer.

* * * * *